US011223292B2

(12) United States Patent
Yang et al.

(10) Patent No.: US 11,223,292 B2
(45) Date of Patent: Jan. 11, 2022

(54) UNITED CONVERTER APPARATUS AND OPERATING METHOD THEREOF

(71) Applicants:HYUNDAI MOTOR COMPANY, Seoul (KR); KIA MOTORS CORPORATION, Seoul (KR)

(72) Inventors: Jin Young Yang, Hanam-si (KR); Jong Pil Kim, Yongin-si (KR); Woo Young Lee, Yongin-si (KR); Ji Han Lee, Hwaseong-si (KR); Youn Sik Lee, Suwon-si (KR); Si Hun Yang, Hwaseong-si (KR); Jin Myeong Yang, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 377 days.

(21) Appl. No.: 16/405,743

(22) Filed: May 7, 2019

(65) Prior Publication Data

US 2020/0186048 A1    Jun. 11, 2020

(30) Foreign Application Priority Data

Dec. 7, 2018  (KR) ........................ 10-2018-0156657

(51) Int. Cl.
| | |
|---|---|
| H02J 7/00 | (2006.01) |
| H02J 7/02 | (2016.01) |
| H02M 1/10 | (2006.01) |
| H02M 1/42 | (2007.01) |
| H02M 3/335 | (2006.01) |
| H02M 1/44 | (2007.01) |
| B60L 50/60 | (2019.01) |
| B60L 53/22 | (2019.01) |

(52) U.S. Cl.
CPC ......... *H02M 3/33592* (2013.01); *B60L 50/66* (2019.02); *B60L 53/22* (2019.02); *H02M 1/4233* (2013.01); *H02M 1/44* (2013.01)

(58) Field of Classification Search
CPC .. H02M 3/33592; H02M 1/44; H02M 1/4233; B60L 50/66; B60L 53/22
USPC ......................................................... 320/109
See application file for complete search history.

(56) References Cited

U.S. PATENT DOCUMENTS

| | | | | |
|---|---|---|---|---|
| 9,114,714 | B2* | 8/2015 | Pham et al. | ............ B60L 58/21 |
| 9,257,864 | B2* | 2/2016 | Pahlevaninezhad et al. | ............... H02J 7/022 |
| 9,496,804 | B2* | 11/2016 | Jang et al. | ............... H02M 7/72 |
| 9,499,060 | B2* | 11/2016 | Kim et al. | ................ H02J 7/02 |
| 9,616,760 | B2* | 4/2017 | Jang et al. | ............... B60L 53/24 |
| 9,758,047 | B2* | 9/2017 | Hou et al. | ........... B60L 11/1811 |
| 10,840,820 | B2* | 11/2020 | Yang et al. | ........... H02M 7/043 |

* cited by examiner

*Primary Examiner* — Sun J Lin
(74) *Attorney, Agent, or Firm* — Slater Matsil, LLP

(57) ABSTRACT

A united converter apparatus and an operating method thereof are disclosed. The united converter apparatus includes a high-voltage charger charging a high-voltage battery, using a commercial power and a low-voltage charger charging a low-voltage battery, using the high-voltage battery. The high-voltage charger includes a voltage level adjustment device boosts a voltage of the commercial power to apply the boosted voltage to the high-voltage battery and drops a high voltage applied from the high-voltage battery to apply the dropped voltage to the low-voltage charger.

14 Claims, 7 Drawing Sheets

UNITED CONVERTER APPARATUS AND OPERATING METHOD THEREOF

CROSS-REFERENCE TO RELATED APPLICATION

This application claims the benefit of priority to Korean Patent Application No. 10-2018-0156657, filed in the Korean Intellectual Property Office on Dec. 7, 2018, the entire contents of which are incorporated herein by reference.

TECHNICAL FIELD

The present disclosure relates to a united converter apparatus and an operating method thereof.

BACKGROUND

Nowadays, developed countries are tightening fuel economy regulations and are actively developing and distributing eco-friendly vehicles, and the demand for a plug-in hybrid vehicle/electric vehicle (PHEV/EV) is surging. However, consumers still do not highly trust the eco-friendly vehicles due to the high price and the inconvenience caused by long charging time and short mileage. As such, the eco-friendly vehicles are being developed to increase mileage by mounting a large capacity battery.

However, there is a need to increase the capacity of the battery charger to shorten the charging time, which increases as the battery capacity increases; as the capacity of the charger increases, the size and material cost also increase in proportion to the capacity.

Because the eco-friendly vehicle has a narrow internal space and are more expensive than the vehicle with an internal combustion engine, it is important to reduce the size and material cost while increasing the capacity of the charger.

SUMMARY

An aspect of the present disclosure provides a united converter apparatus capable of covering the wide voltage range of a high-voltage battery, and an operating method thereof.

According to an aspect of the present disclosure, a united converter apparatus may include a high-voltage charger charging a high-voltage battery, using commercial power and a low-voltage charger charging a low-voltage battery, using the high-voltage battery. The high-voltage charger may include a voltage level adjustment device boosts a voltage of the commercial power to apply the boosted voltage to the high-voltage battery and drops a high voltage applied from the high-voltage battery to apply the dropped voltage to the low-voltage charger.

In an embodiment, the high-voltage charger may include a first filter reducing noise of the commercial power, a power factor correction converting an AC component of the commercial power to a DC component of the commercial power and to compensate for a low frequency ripple, a first switching module converting the DC component of a voltage applied from the power factor correction to an AC component of the voltage, a transformer changing a level of the voltage output by the first switching module, and a second switching module converting an AC component of a voltage applied from the transformer, to a DC component of the voltage.

In an embodiment, the high-voltage charger may further include a voltage stabilizer configured to stabilize the voltage applied from the second switching module.

In an embodiment, the voltage stabilizer may include a capacitor.

In an embodiment, the voltage level adjustment device may boost a level of a voltage output from the voltage stabilizer to a predetermined level to apply the boosted voltage to the high-voltage battery.

In an embodiment, the united converter apparatus may further include a second filter reducing noise of the voltage output from the voltage level adjustment device.

In an embodiment, when the low-voltage battery is charged, the second filter may reduce noise of the voltage applied from the high-voltage battery.

In an embodiment, when the low-voltage battery is charged, the voltage level adjustment device may drop a level of the voltage applied from the high-voltage battery, to a predetermined level.

In an embodiment, the voltage stabilizer may stabilize the voltage dropped by the voltage level adjustment device.

In an embodiment, the low-voltage charger may include a third switching module converting a DC component of the voltage applied from the voltage stabilizer, to an AC component of the voltage, a transformer converting the voltage applied from the third switching module, and a rectifier rectifying the voltage applied from the transformer to apply the rectified voltage to the low-voltage battery.

In an embodiment, the voltage level adjustment device may include an inductor performing charging or discharging of a high voltage of the commercial power or the high-voltage battery, a first switching element and a second switching element performing transmission or blocking of the voltage, and a capacitor performing charging or discharging of the high voltage of the commercial power or the high-voltage battery.

In an embodiment, the voltage level adjustment device may include a first switching element and a second switching element connected to each other in series, an inductor, one end of which is connected to a common node of the first switching element and the second switching element, and a capacitor connected in parallel with the first switching element and second switching element.

According to another aspect of the present disclosure, an operating method of a united converter apparatus may include converting an AC component of commercial power to a DC component of the commercial power and to compensate for a low frequency ripple, converting an DC component of a voltage, in which the low frequency ripple is compensated, to an AC component, after converting a voltage of the AC component, converting the AC component to a DC component again and then boosting a voltage of the DC component to a predetermined high-voltage level, and applying the boosted high voltage to a high-voltage battery to charge the high-voltage battery.

In an embodiment, the method may further include removing noise of the commercial power and removing noise of the boosted high voltage.

In an embodiment, the method may further include stabilizing the voltage of the DC component before boosting a voltage of the DC component to the predetermined high-voltage level.

According to another aspect of the present disclosure, an operating method of a united converter apparatus may include dropping a high voltage applied from a high-voltage battery to a predetermined level, converting an DC component of the dropped voltage to an AC component, converting and rectifying a voltage of the AC component, and applying the rectified voltage to a low-voltage battery to charge the low-voltage battery.

In an embodiment, the method may further include reducing noise of the high-voltage battery and stabilizing the dropped voltage.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
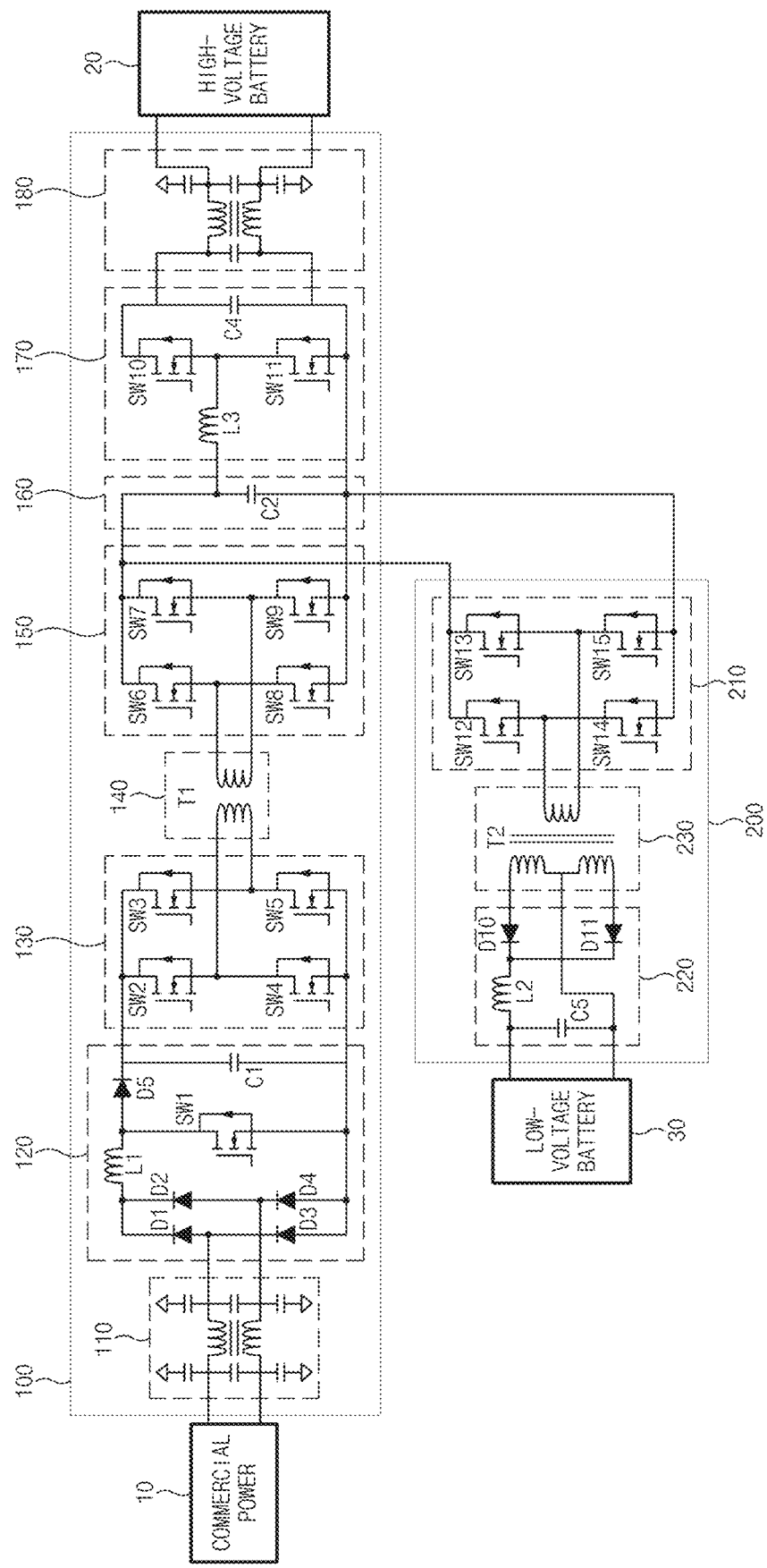
FIG. 1 is a block diagram of a united converter apparatus, according to an embodiment of the present disclosure.

Hereinafter, embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of embodiments of the present disclosure, the terms first, second, A, B, (a), (b), and the like may be used herein. These terms are only used to distinguish one element from another element, but do not limit the corresponding elements irrespective of the nature, order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

The present disclosure discloses a configuration that makes it possible to design a circuit for common use of a low-voltage charger and a high-voltage charger, by including a configuration to step up the voltage level to charge the high-voltage battery and to step down the voltage level to charge the low-voltage battery.

Below, various embodiments of the present disclosure will be described in detail with reference to FIGS. 1 to 7.

FIG. 1 is a block diagram illustrating a configuration of a vehicle system including a united converter apparatus, according to an embodiment of the present disclosure.

Referring to FIG. 1, a united converter apparatus according to an embodiment of the present disclosure may include a high-voltage charger 100 for charging a high-voltage battery 20 and a low-voltage charger 200 for charging a low-voltage battery 30. In embodiments, a voltage level for charging the high-voltage battery is higher than that for charging the low-voltage battery, and a voltage level from the high-voltage battery is higher than that from the low-voltage battery.

The high-voltage charger 100 performs charging of a high-voltage battery 20. To this end, the high-voltage charger 100 includes a filter 110, power factor correction (PFC) 120, a switching circuit module 130, a transformer 140, a switching circuit module 150, a voltage stabilizer 160, a voltage level adjustment device or circuit 170, and a filter 180.

The filter 110 removes the noise of a signal as an electromagnetic interference (EMI) filter. That is, the filter 110 removes noise from commercial power 10. In embodiments, the circuit of the filter 110 may be a typical filter circuit, and thus the detailed description thereof will be omitted.

The PFC 120 converts the AC component (AC) of the commercial power, which is applied from the filter 110, into a DC component (DC) and compensates for the low frequency ripple. In embodiments, Power Factor Correction (PFC) operates as a circuit to correct the power factor (the ratio indicating how efficiently AC power is used) and improve the power factor and thus performs a stable power supply.

The PFC 120 includes diodes D1, D2, D3, D4, and D5, an inductor L1, a capacitor C1, and a switching element SW1. The diodes D1 and D3 are connected to each other in series and the output voltage of one end of the filter 110 is applied to the common node of the diodes D1 and D3. The diodes D2 and D4 are connected to each other in series and are connected in parallel with the diodes D1 and D3, and the output voltage of the other end of the filter 110 is applied to the common node of the diodes D2 and D4. One end of inductor L1 is connected to the output terminal of the diodes D1 and D2, and the other end of inductor L1 is connected to the diode D5. The switching element SW1 is connected between the input terminal of the diodes D3 and D4 and the output terminal of inductor L1; and the capacitor C1 is connected to the input terminal of the diodes D3 and D4 and the output terminal of the diode D5.

The switching module 130 switches the voltage output from the PFC 120 and provides the switched voltage to the transformer 140. In embodiments, the switching module 130 converts the DC component of the output voltage, which is output from the PFC 120, into an AC component and provides the transformer 140 with the AC component. To this end, the switching module 130 includes a plurality of switching elements or switches SW2, SW3, SW4, and SW5; the switching elements SW2 and SW4 are connected to each other in series between one end and the other end of the capacitor C1; the switching elements SW3 and SW5 are also connected to each other in series between one end and the other end of the capacitor C1 and are connected in parallel with the switching elements SW2 and SW4, which are connected to each other in series. The voltage output through the common node of the switching elements SW2 and SW4 is applied to one end of the primary side of the transformer T1 of the transformer 140; the voltage output through the common node of the switching elements SW3 and SW5 is applied to the other end of the primary of the transformer T1 of the transformer 140.

The transformer 140 transforms the voltage switched by the switching module 130. At this time, the transformer 140 is an isolation transformer; the transformer 140 includes a transformer in which a side (primary side) receiving an AC power and a side (secondary side) supplying power are insulated. As such, the transformer 140 may prevent mutual interference between the power supplies and may block noise or impulsive abnormal voltage on the primary side, by isolating the primary side and the secondary side of the transformer T1. In the present disclosure, the transformer 140 isolates commercial power and high voltage.

The switching module 150 switches the AC component of the voltage, which is output from the transformer 140, to a DC component of the voltage and transmits the DC component of the voltage to the voltage level adjustment circuit 170 through the voltage stabilizer 160.

To this end, the switching circuit module 150 may include a plurality of switching elements or switches SW6, SW7, SW8, and SW9. The switching elements SW6 and SW8 are connected to each other in series; one end of the secondary side of the transformer T1 of the transformer 140 is connected to the common node of the switching elements SW6 and SW8; the switching elements SW7 and SW9 are connected to each other in series and are connected in parallel with the switching elements SW6 and SW8; the other end of the secondary side of the transformer T1 of the transformer 140 is connected to the common node of the switching elements SW7 and SW9.

The voltage stabilizer 160 stabilizes the DC component having large energy fluctuations. To this end, the voltage stabilizer 160 includes a capacitor C2 connected between the output terminal of the switching elements SW6 and SW7 and the output terminal of the switching elements SW8 and SW9.

The voltage level adjustment device 170 is a boost switching module and increases the level of the output voltage output from the voltage stabilizer 160. This may be to step up the voltage level for the purpose of satisfying the high-voltage level for charging the high-voltage battery 20, and may step up the voltage to be suitable for the desired high-voltage level. Moreover, when the voltage level of the high-voltage battery 20 fluctuates significantly, the voltage level adjustment device 170 steps down the voltage level of the high-voltage battery 20 to provide the low-voltage charger 200 with the voltage of a specific level, and thus it is helpful to design a circuit for charging a low-voltage battery 30. As such, the voltage level adjustment device 170 provides a voltage of a specific level regardless of the battery voltage range, and thus it may be easy to design the switching modules 130 and 150, the transformer 140, and the like of the high-voltage charger 100 and the low-voltage charger 200.

The voltage level adjustment device 170 includes an inductor L3, switching elements or switches SW10 and SW11, and a capacitor C4. The inductor L3 performs stepping up/down the voltage, by charging or discharging the voltage output from the voltage stabilizer 160. The switching elements SW10 and SW11 are connected to each other in series; the output terminal of inductor L3 is connected to the common node of switching elements SW10 and SW11; and the capacitor C4 is connected in parallel with the switching elements SW10 and SW11 that are connected to each other in series. At this time, the capacitor C4 performs charging or discharging.

The filter 180 is an electromagnetic interference filter (EMI) filter such as the filter 110 and removes the noise of the voltage output from the voltage level adjustment device 170 to transmit the noise-free voltage to the high-voltage battery 20. Here, the detailed circuit of the filter 180 is a typical circuit such as the filter 110, and thus the detailed description thereof will be omitted.

The low-voltage charger 200 performs charging of the low-voltage battery 30. To this end, the low-voltage charger 200 includes a switching circuit module 210, a transformer 220, and a rectifier 230.

The switching module 210 converts a DC component of a high-voltage applied from the voltage stabilizer 160 of the high-voltage charger 100 to an AC component. To this end, the switching circuit module 210 may include a plurality of switching elements or switches SW12, SW13, SW14, and SW15. The switching elements SW12 and SW14 are connected to each other in series; the switching elements SW13 and SW15 are also connected to each other in series; the switching elements SW13 and SW15 are connected in parallel with the switching elements SW12 and SW14 that are connected to each other in series; the voltage output from the common node of the switching elements SW12 and SW13 is applied to one end of the primary side of the transformer 220, and the voltage output from the common node of the switching elements SW14 and SW15 is applied to the other end of the primary side of the transformer 220.

The transformer 220 transforms the voltage switched by the switching module 210. At this time, the transformer 220 is an isolation transformer and isolates the high-voltage battery 20 and the low-voltage battery 30.

The rectifier 230 rectifies the output of the transformer 220 and converts an AC component of the voltage output from the transformer 220 into a DC component of the voltage; the rectifier 230 includes diodes D10 and D11, an inductor L2, and a capacitor C5. The diodes D10 and D11 are connected in parallel with each other; the inductor L2 is connected to the output terminal of the diode 10; the capacitor C5 is connected between the output terminal of the inductor L2 and one end of the secondary side of the transformer 220.

As such, the present disclosure may have a united converter structure that integrates a high-voltage charger and a low-voltage charger and may cover a wide voltage range of a high-voltage battery by including a switching module for stepping up or down a voltage level. Moreover, the area and cost may be minimized by commonly using the capacitor C2 of the voltage stabilizer 160 in the high-voltage charger and the low-voltage charger.

Figure 2:
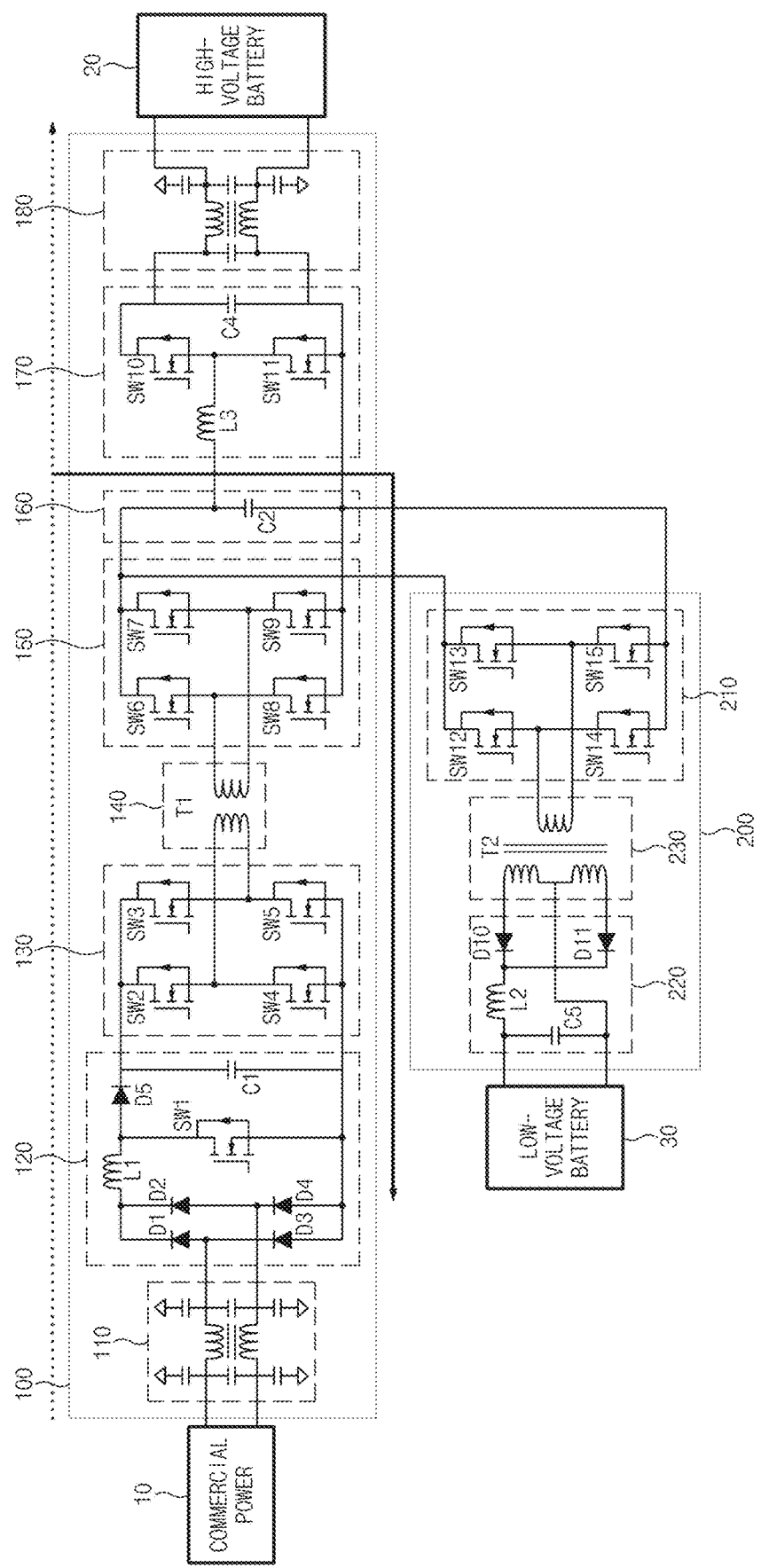
FIG. 2 is a circuitry diagram for describing an implementation of operation of charging a high-voltage battery of a united converter apparatus, according to an embodiment of the present disclosure.

FIG. 2 is a circuitry diagram for describing an implementation of operation of charging a high-voltage battery of a united converter apparatus, according to an embodiment of the present disclosure. An operation of charging a high-voltage battery when the vehicle is not driving will be described with reference to FIG. 2.

When the noise in the AC component of the commercial power is removed through the filter 110 and then the noise-free AC component of the commercial power is applied to the PFC 120, the PFC 120 converts the AC component of the commercial power into the DC component of the commercial power through the on/off operation of the switching element SW1 and compensates for the power factor. Next, the switching module 130 converts the DC component to the AC component again, and then the transformer 140 changes the magnitude of the AC component to transmit the AC component to the switching module 150. As such, the switching module 150 converts the AC component to the DC component through a switching operation. At this time, when the level of the voltage output from the switching module 150 is lower than a high-voltage level required by the high-voltage battery 20, the voltage level adjustment device 170 boosts a voltage to provide the boosted voltage to the high-voltage battery 20. For example, when the voltage output from the switching module 150 is 170~413 V (Vout1) that is the battery voltage level of the normal HEV, EV, or PHEV, the voltage level adjustment device 170 may boost the voltage to 268~826 V to supply the boosted voltage to the high-voltage battery 20, by turning on and off the switching elements SW10 and SW11.

Figure 3:
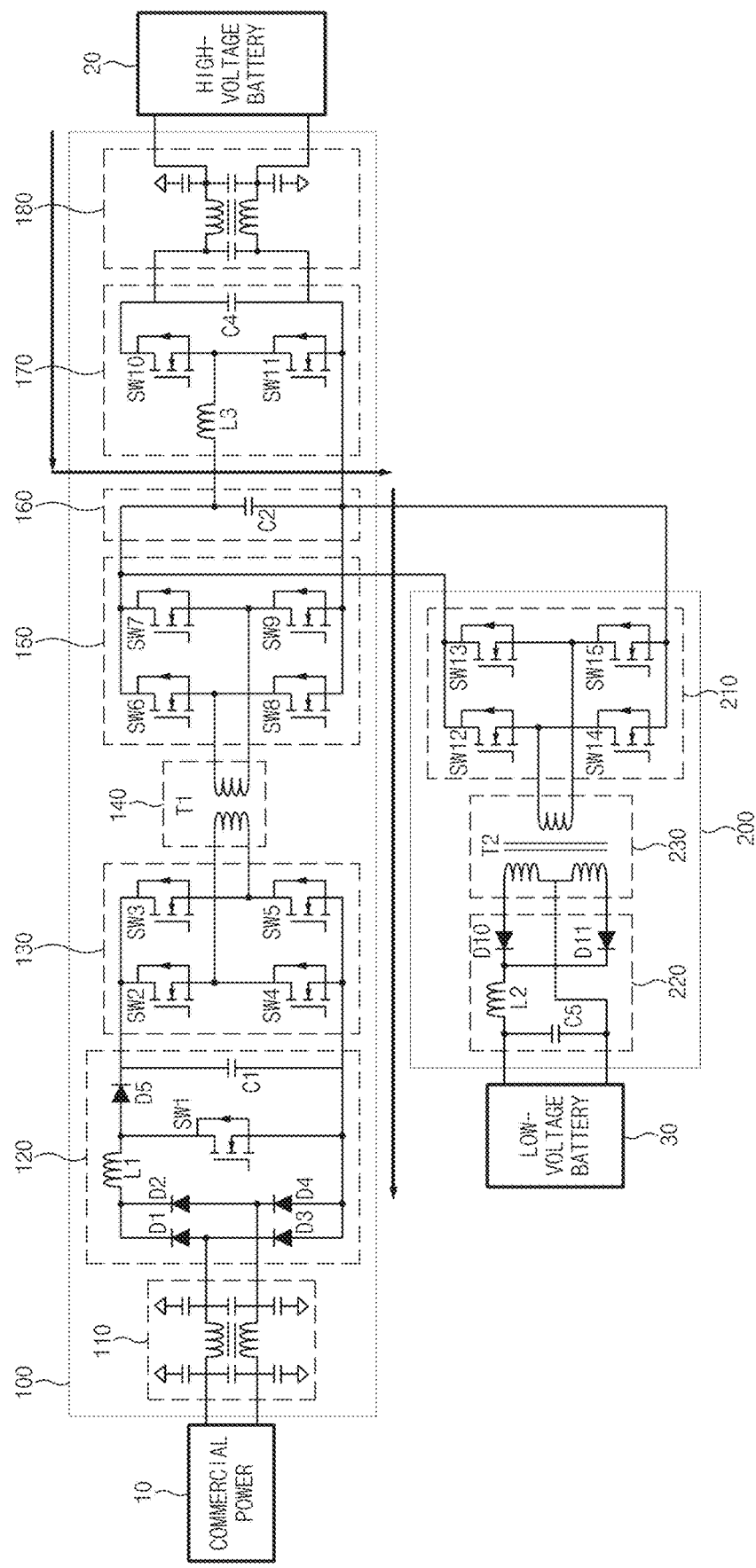
FIG. 3 is a circuitry diagram for describing an implementation of operation of charging a low-voltage battery of a united converter apparatus, according to an embodiment of the present disclosure.

FIG. 3 is a circuitry diagram for describing an implementation of operation of charging a low-voltage battery of a united converter apparatus, according to an embodiment of the present disclosure.

The voltage level adjustment device 170 may drop the voltage level of the high-voltage battery applied from the high-voltage battery 20. As such, the switching module 210 converts the DC component of the dropped voltage Vout1 into an AC component, and the transformer 220 converts the magnitude of the AC component through the turns ratio of transformer t2 and provides the AC component of the converted magnitude to the rectifier 230. As such, the rectifier 230 converts the AC component into the DC component and charges the low-voltage battery 30 by providing the DC component to the low-voltage battery 30.

When the high-voltage output from the high-voltage battery 20 is 268~826 V, the voltage level adjustment device 170 drops a high voltage to adjust the dropped voltage to a range of 170~413 V, stabilizes the adjusted voltage through the capacitor C2, and then provides the stabilized voltage to the switching module 210. As such, the high voltage is not directly applied to the low-voltage charger 200, and the dropped voltage is applied to the low-voltage charger 200, and thus it is suitable for low-voltage charging; the design of the part specification (e.g., a transformer) of the low-voltage charger may be unified because the dropped voltage covers the voltage of 170~413 V whenever the low-voltage charging is performed.

As such, the present disclosure may make it possible to cover a high-voltage battery voltage range that is different for each vehicle type, by stepping up or down the voltage through the voltage level adjustment device 170 being a boost switching module, thereby unifying the part specification (e.g., a transformer) of the high-voltage charger.

Figure 4A:
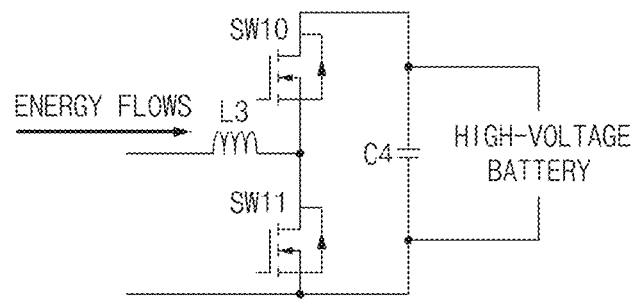
FIG. 4A is a diagram for describing an operation flow when a high-voltage battery of a switching module is charged, according to an embodiment of the present disclosure.
Figure 4B:
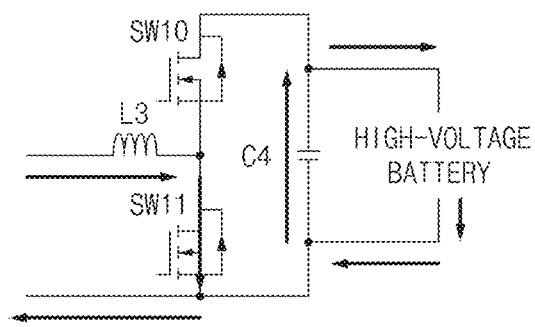
FIG. 4B is a diagram for describing an operation flow at a point in time when the switching element SW10 is turned off and the switching element SW11 is turned on when a high-voltage battery of a switching module is charged, according to an embodiment of the present disclosure.
Figure 4C:
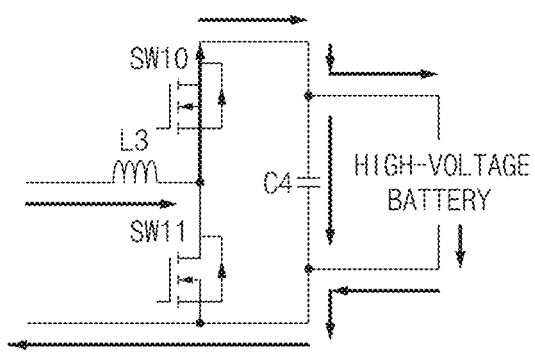
FIG. 4C is a diagram for describing an operation flow at a point in time when the switching element SW10 is turned on and the switching element SW11 is turned off when a high-voltage battery of a switching module is charged, according to an embodiment of the present disclosure.

FIG. 4A is a diagram for describing an operation flow when a high-voltage battery of the voltage level adjustment device 170 is charged, according to an embodiment of the present disclosure. FIG. 4B is a diagram for describing an operation flow at a point in time when the switching element SW10 is turned off and the switching element SW11 is turned on when a high-voltage battery of the voltage level adjustment device 170 is charged, according to an embodiment of the present disclosure. FIG. 4C is a diagram for describing an operation flow at a point in time when the switching element SW10 is turned on and the switching element SW11 is turned off when a high-voltage battery of the voltage level adjustment device 170 is charged, according to an embodiment of the present disclosure.

As shown in FIG. 4A, a voltage (energy) flows to the high-voltage battery, when a high-voltage battery is charged. As shown in FIG. 4B, when the switching element SW10 is turned off and the switching element SW11 is turned on, the voltage output through the voltage stabilizer 160 is accumulated in the inductor L3 and then is discharged through the capacitor C4; the capacitor C4 and the high-voltage battery 20 form a loop. As shown in FIG. 4C, when the switching element SW10 is turned on and the switching element SW11 is turned off, the inductor L3 is discharged and a voltage is accumulated in the capacitor C4; a voltage from adding a voltage V1 applied to the capacitor C2 and a voltage VL3 applied to the inductor L3 is applied to a high-voltage battery and then the high-voltage battery is charged. As such, in a battery charging mode, the ON/OFF of the switching element SW10 and the switching element SW11 may be controlled depending on the voltage level of the high-voltage battery.

Figure 5A:
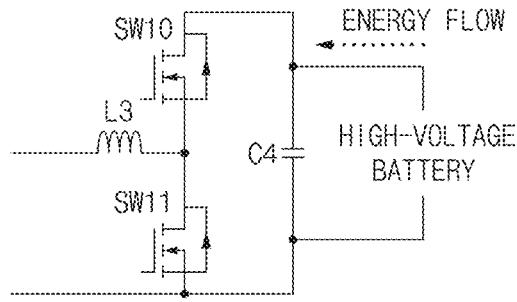
FIG. 5A is a diagram for describing an operation flow when a high-voltage battery of a switching module is discharged, according to an embodiment of the present disclosure.
Figure 5B:
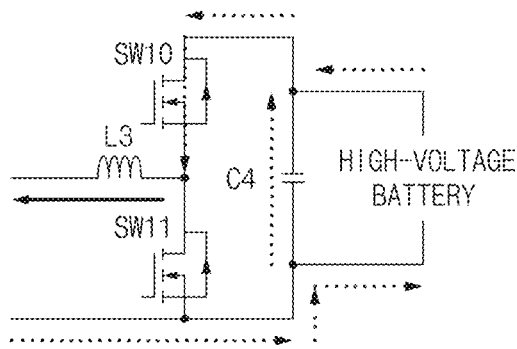
FIG. 5B is a diagram for describing an operation flow at a point in time when the switching element SW10 is turned on and the switching element SW11 is turned off when a high-voltage battery of a switching module is discharged, according to an embodiment of the present disclosure.
Figure 5C:
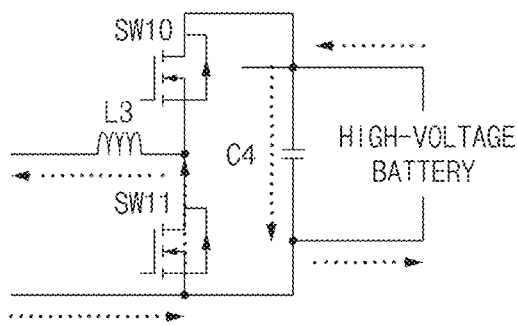
FIG. 5C is a diagram for describing an operation flow at a point in time when the switching element SW10 is turned off and the switching element SW11 is turned on when a high-voltage battery of a switching module is discharged, according to an embodiment of the present disclosure.

FIG. 5A is a diagram for describing an operation flow when a high-voltage battery of the voltage level adjustment device 170 is discharged, according to an embodiment of the present disclosure. FIG. 5B is a diagram for describing an operation flow at a point in time when the switching element SW10 is turned on and the switching element SW11 is turned off when a high-voltage battery of the voltage level adjustment device 170 is discharged, according to an embodiment of the present disclosure. FIG. 5C is a diagram for describing an operation flow at a point in time when the switching element SW10 is turned off and the switching element SW11 is turned on when a high-voltage battery of the voltage level adjustment device 170 is discharged, according to an embodiment of the present disclosure.

Referring to FIG. 5A, while a vehicle is driving, the voltage (energy) is discharged from the high-voltage battery 20. Referring to FIG. 5B, when the switching element SW10 is turned on and the switching element SW11 is turned off, a voltage applied from the high-voltage battery 20 is discharged in the capacitor C4 and is accumulated in the inductor L3. Referring to FIG. 5C, when the switching element SW10 is turned off and the switching element SW11 is turned on, the inductor L3 discharges the voltage and the capacitor C4 accumulates the voltage. At this time, a value obtained by subtracting the voltage VL3 applied to the inductor L3 from the high-voltage battery is the voltage V1 applied to the capacitor C2. As such, while a vehicle is driving (in a battery discharging mode), the ON/OFF of the switching element SW10 and the switching element SW11 may be controlled depending on the voltage level of the voltage V1.

Figure 6:
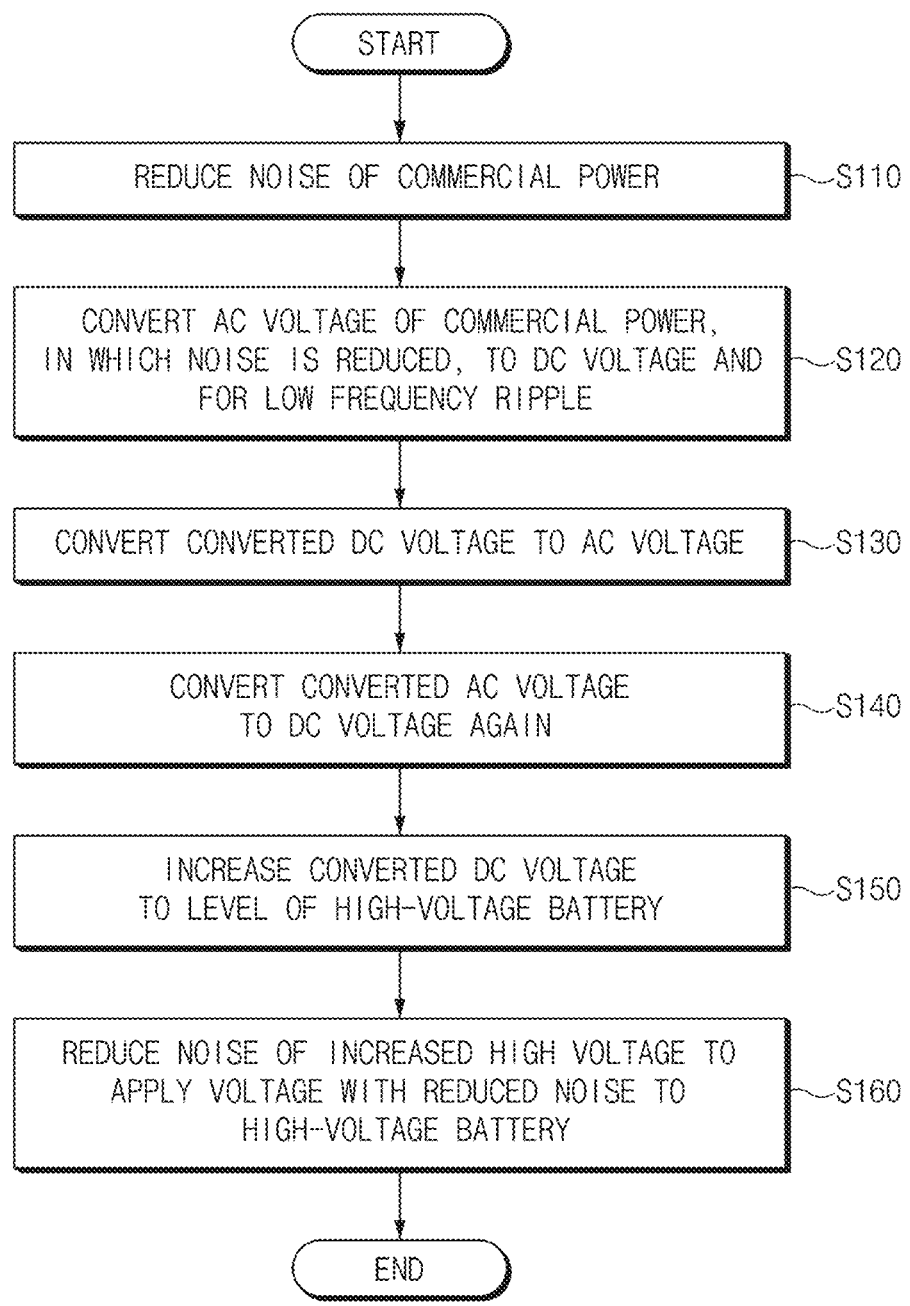
FIG. 6 is a flowchart illustrating a high-voltage charging method, according to an embodiment of the present disclosure.

Hereinafter, according to an embodiment of the present disclosure, a high-voltage charging method will be described in detail with reference to FIG. 6. FIG. 6 is a flowchart illustrating a high-voltage charging method, according to an embodiment of the present disclosure.

Referring to FIG. 6, in operation 5110, the filter 110 reduces the noise of commercial power. In operation 5120, the PFC 120 converts the AC voltage of the commercial power, in which the noise is reduced, to a DC voltage to compensate for a low frequency ripple.

Next, in operation 5130, the switching module 130 converts the DC voltage, which is converted by the PFC 120, to the AC voltage to provide the switching module 150 through the transformer 140 with the AC voltage; in operation 5140, the switching module 150 converts the AC voltage, which is provided through the transformer 140, to the DC voltage again.

In operation 5150, the voltage level adjustment device 170 being boost switching module increases the level of the voltage received by the switching module 150, by the predetermined level; in operation 5160, the filter 180 reduces the noise, applies the noise-free voltage to a high-voltage battery, and charges the high-voltage battery.

Figure 7:
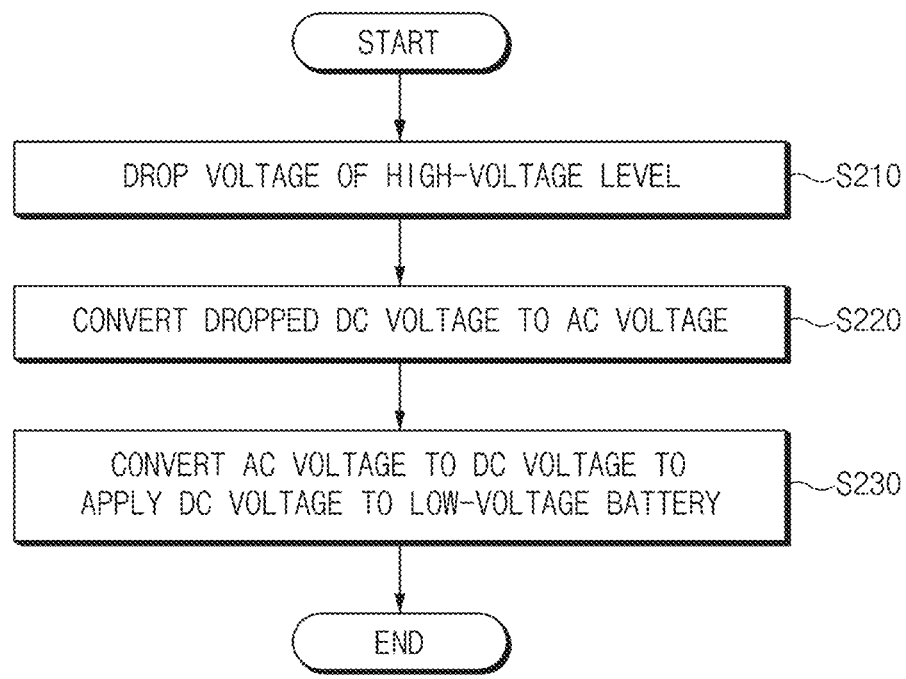
FIG. 7 is a flowchart illustrating a low-voltage charging method, according to an embodiment of the present disclosure.

Hereinafter, according to an embodiment of the present disclosure, a low-voltage charging method will be described in detail with reference to FIG. 7. FIG. 7 is a flowchart illustrating a low-voltage charging method, according to an embodiment of the present disclosure.

Referring to FIG. 7, in operation 5210, the voltage level adjustment device 170 drops the voltage of a high-voltage level, which is applied by the high-voltage battery 20; in operation 5220, the switching module 210 converts the DC component of the dropped voltage, to the AC component and then the transformer 220 convert the voltage to transmit the converted voltage to the rectifier 230. As such, in operation 5230, the rectifier 230 converts the AC component of the converted voltage to the DC component to apply the DC component of the converted voltage to the low-voltage battery 30, and thus the charging of the low-voltage battery 30 is performed.

As such, for the purpose of covering the wide voltage ranges of the high-voltage batteries that are different depending on the system of the electric vehicle (EV/PHEV vehicle), the specifications of the parts (e.g., transformer) of the low-voltage charger (LDC) and the high-voltage charger (OBC) need to be different from each other. In this case, because component cost/manufacturing process/development cost/test cost, or the like increases, as a result, the overall cost of united converters including a low-voltage charger (LDC) and a high-voltage chargers (OBC) will increase. As such, according to an embodiment of the present disclosure, the high-voltage battery voltage range and the low-voltage battery voltage range may be satisfied by adding a switching module capable of stepping up or down the voltage, and thus the unified design of the united converter of the low-voltage charger (LDC) and the high-voltage charger (OBC) makes it possible to suppress the cost increase.

The area and cost may be reduced because the low-voltage charger 200 does not include a filter for low-voltage charging separately by filtering the high-voltage applied by the high-voltage battery 20 through the filter 180.

Moreover, the area and cost may be reduced because the low-voltage charger 200 does not include a capacitor separately by performing voltage stabilization using the capacitor C2 of the high-voltage charger 100.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The technology may cover the wide voltage range of a high-voltage battery and may reduce the area and cost by sharing a voltage stabilizer and a filter of a high-voltage charger.

Besides, a variety of effects directly or indirectly understood through this disclosure may be provided.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A united converter apparatus comprising:
   a high-voltage charger configured to charge a high-voltage battery, using commercial power; and
   a low-voltage charger configured to charge a low-voltage battery, using the high-voltage battery, wherein the high-voltage charger includes:
      a voltage stabilizer configured to stabilize a DC component of a voltage, and
      a voltage level adjustment circuit, wherein the voltage level adjustment circuit is configured to:
         boost a voltage of the commercial power to apply the boosted voltage to the high-voltage battery,
         drop a voltage from the high-voltage battery to apply the dropped voltage to the low-voltage charger, and
         boost a level of a voltage output from the voltage stabilizer to a predetermined level to apply the boosted voltage to the high-voltage battery.

2. The united converter apparatus of claim 1, wherein the high-voltage charger includes:
   a first filter configured to reduce a noise of the commercial power;
   a power factor correction circuit configured to convert an AC component of the commercial power to a DC component of the commercial power and to compensate for a low frequency ripple;
   a first switching circuit module configured to convert the DC component of a voltage applied from the power factor correction to an AC component of the voltage;
   a transformer configured to change a level of the voltage output by the first switching circuit module; and
   a second switching circuit module configured to convert an AC component of a voltage applied from the transformer to the DC component of the voltage.

3. The united converter apparatus of claim 2, wherein the voltage stabilizer is configured to stabilize the voltage applied from the second switching circuit module.

4. The united converter apparatus of claim 3, wherein the voltage stabilizer includes a capacitor.

5. The united converter apparatus of claim 3, wherein the voltage stabilizer stabilizes the voltage dropped by the voltage level adjustment circuit.

6. The united converter apparatus of claim 5, wherein the low-voltage charger includes:
- a third switching circuit module configured to convert a DC component of the voltage applied from the voltage stabilizer, to an AC component of the voltage;
- a transformer configured to convert the voltage applied from the third switching circuit module; and
- a rectifier configured to rectify the voltage applied from the transformer to apply the rectified voltage to the low-voltage battery.

7. The united converter apparatus of claim 1, further comprising:
- a second filter configured to reduce a noise of the boosted voltage output from the voltage level adjustment circuit.

8. The united converter apparatus of claim 7, wherein the second filter is configured to:
- when the low-voltage battery is charged, reduce a noise of the voltage applied from the high-voltage battery.

9. The united converter apparatus of claim 1, wherein the voltage level adjustment circuit is configured to:
- when the low-voltage battery is charged, drop a level of the voltage from the high-voltage battery to a predetermined level for applying to the low-voltage battery.

10. The united converter apparatus of claim 1, wherein the voltage level adjustment circuit includes:
- an inductor configured to perform charging the boosted voltage or discharging a voltage the high-voltage battery;
- a first switch and a second switch configured to perform transmission or blocking of the voltage; and
- a capacitor configured to perform charging the boosted voltage or discharging a voltage of the high-voltage battery.

11. The united converter apparatus of claim 1, wherein the voltage level adjustment circuit includes:
- a first switch and a second switch connected to each other in series;
- an inductor, one end of which is connected to a common node of the first switch and the second switch; and
- a capacitor connected in parallel with the first switch and the second switch.

12. A method of operating a united converter apparatus, the method comprising:
- converting an AC component of a commercial power to a DC component and compensating for a low frequency ripple;
- converting a DC component of a voltage, in which the low frequency ripple is compensated, to a further AC component;
- converting the further AC component to a further DC component;
- stabilizing a voltage of the further DC component;
- boosting the stabilized voltage of the further DC component to a predetermined high-voltage level; and
- applying the boosted stabilized voltage to a high-voltage battery to charge the high-voltage battery.

13. The method of claim 12, further comprising:
removing noise of the commercial power; and
removing a noise of the boosted voltage.

14. A method of operating a united converter apparatus, the method comprising:
- dropping a voltage from a high-voltage battery to a predetermined level;
- converting a DC component of the dropped voltage to an AC component;
- converting and rectifying a voltage of the AC component;
- applying the rectified voltage to a low-voltage battery to charge the low-voltage battery;
- reducing a noise of the high-voltage battery;
- stabilizing the dropped voltage;
- converting a DC component of the stabilized dropped voltage, to an AC component of the stabilized dropped voltage;
- transforming the AC component of the stabilized dropped voltage; and
- rectifying the transformed AC component of the stabilized dropped voltage to apply the rectified voltage to the low-voltage battery.

* * * * *